Feb. 8, 1944. W. G. WILSON 2,341,255
PLUG VALVE
Filed June 5, 1941 4 Sheets-Sheet 3

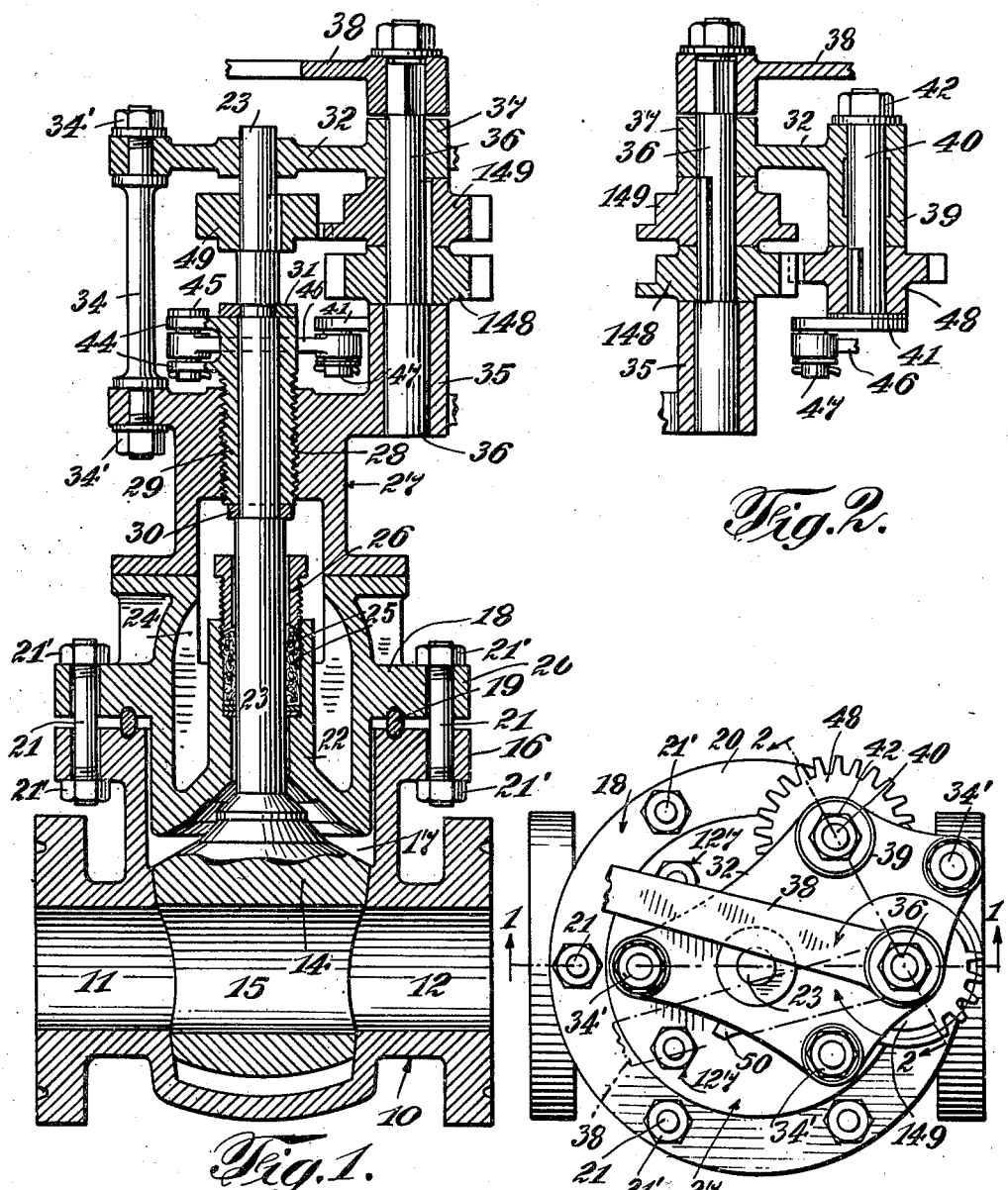

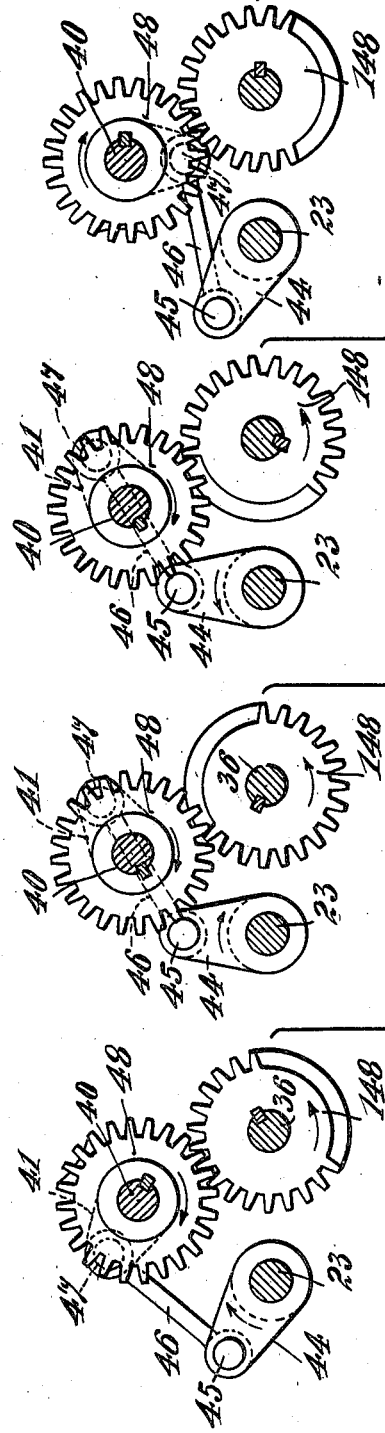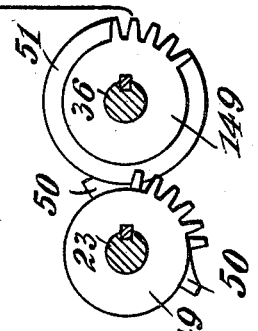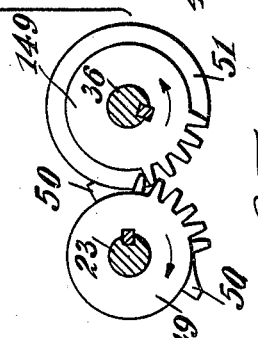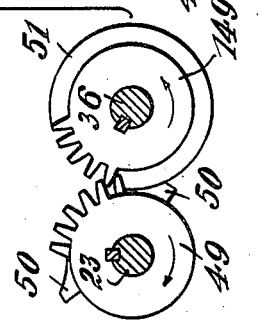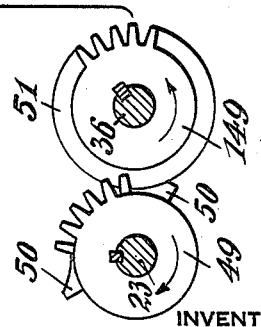

INVENTOR
Wylie G. Wilson
BY
Ramsey, Kent, Chisholm and Lutz
his ATTORNEYS

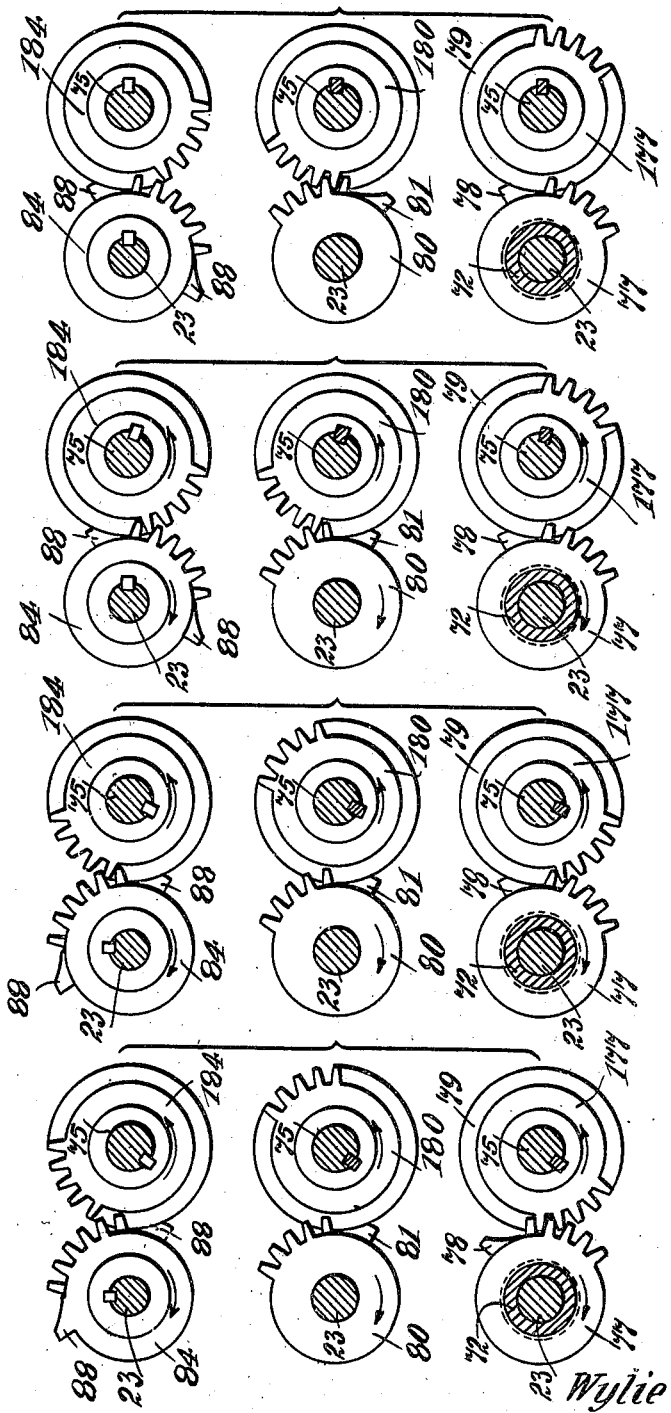

Patented Feb. 8, 1944

2,341,255

UNITED STATES PATENT OFFICE 2,341,255

PLUG VALVE

Wylie G. Wilson, Elizabeth, N. J., assignor to Everlasting Valve Company, Jersey City, N. J., a corporation of New Jersey Application June 5, 1941, Serial No. 396,710

11 Claims. (Cl. 74—22)

This invention relates to improvements in valves and more particularly to improvements in valves of the type known to the art as plug valves.

An object of the present invention is to provide a valve structure and operating mechanism of such character that a continuous movement of an operating member in a selected direction causes axial movement of the plug, rotation thereof and reversal axial movement in sequence.

Another object of the invention is to provide operating mechanism for a plug valve of such character that the sequential movements of the plug occur one in the absence of the other.

Another object of the invention is to provide operating mechanism as before defined, in which the axial movement of the plug is accomplished without rotary movement thereof and rotary movement is accomplished without axial movement.

Another object of the invention is to provide operating mechanism as before defined of such character that positive means are provided for assuring movement of one type of the plug without the accompaniment of movement of the other type thereof.

A further object of the invention is to provide valve operating mechanism of such character that rotation of a crank like member in intermittent fashion and in a single direction causes axial movement of the plug in one direction and then reverse axial movement thereof.

A further object of the invention is to provide operating mechanism for a plug valve as just described in which means are provided for rotating the plug in the interval between the periods of axial movement thereof.

A still further object of the invention is to provide operating mechanism for a plug valve of such character that three sets of mutilated gears or gear sectors are caused to operate in such sequence as to accomplish the purposes set forth hereinbefore.

In carrying out the foregoing and other objects of the invention in each form thereof, use is made of a valve made up of a casing and a sealing member (preferably a plug) therein, which plug member has a through opening adapted to be aligned with the openings in the valve casing. In one form of the invention, use is made of a crank actuating member for imparting axial movement to the plug so that rotation thereof can be facilitated without incurring the usual wear attending upon rotating a plug while firmly seated. In this form of the invention the stem of the plug passes through a sleeve in which the stem is free to rotate but in which axial movement between the stem and the sleeve is prevented. The sleeve is threaded into a part of the supporting structure of the valve framework so that rotation of the sleeve in one direction will cause axial movement of the stem in one direction while a rotation of the sleeve in the opposite direction will cause a reverse axial movement of the stem. The rotary movement of the sleeve is accomplished by a connecting rod secured at one end to the sleeve and at the other end to a crank member. This crank member is so geared to an operating or drive shaft as to cause it to be rotated intermittently in such fashion as to rotate the sleeve through an arc of predetermined extent and then rotate in reverse direction through the same arc. The valve stem has a mutilated gear or gear sector thereon in mesh with a pinion on the drive shaft before mentioned and the relation between the pinion and the mutilated gear is such that rotary movement from the drive shaft is transmitted to the stem during a selected part of the path of movement of the operating shaft.

The two pinions on the drive shaft and the two gears associated therewith are so formed that a continuous movement of the drive shaft through the agency of a handle or lever will cause first axial movement of the stem, then rotary movement thereof and finally reverse axial movement of the stem.

In another form of the invention, use is made of a valve stem passing through a sleeve which has a mutilated gear or gear sector on one end thereof. This sleeve is externally threaded and fits within a second internally threaded sleeve which is so secured in the supporting structure of the valve as to be capable only of rotary movement. Such movement also is the only movement, relative to the first sleeve, of which the valve stem is capable. The internally threaded sleeve has a mutilated gear or gear sector on one end thereof. A third mutilated gear or gear sector is secured to the upper end of the valve stem so that rotation of this gear will cause rotation of the stem. An operating shaft is provided on which three pinions are secured, the three pinions being associated with the three gears before described. These pinions and three associated gears are so constructed that movement of the operating shaft through a predetermined arc of rotation will cause, first axial movement of the stem in one direction, then rotary movement of the stem, and finally reverse axial movement of the stem; and in addition, the pinions and gears are so constructed that when one type of movement is being accomplished a positive lock against another type of movement is provided.

Other features, objects and advantages of the invention will become apparent by reference to the following detailed description of the accompanying drawings wherein, Fig. 1 is a vertical section taken substantially on the line 1—1 of Fig. 3, showing part of the operating mechanism associated with the plug;

Fig. 2 is a section taken substantially on the line 2—2 of Fig. 3 and showing another part of the operating mechanism;

Fig. 3 is a top or plan view of the valve structure;

Fig. 4 is a diagrammatic illustration of the manner in which gears utilized in the invention are associated.

Figures 9, 10:
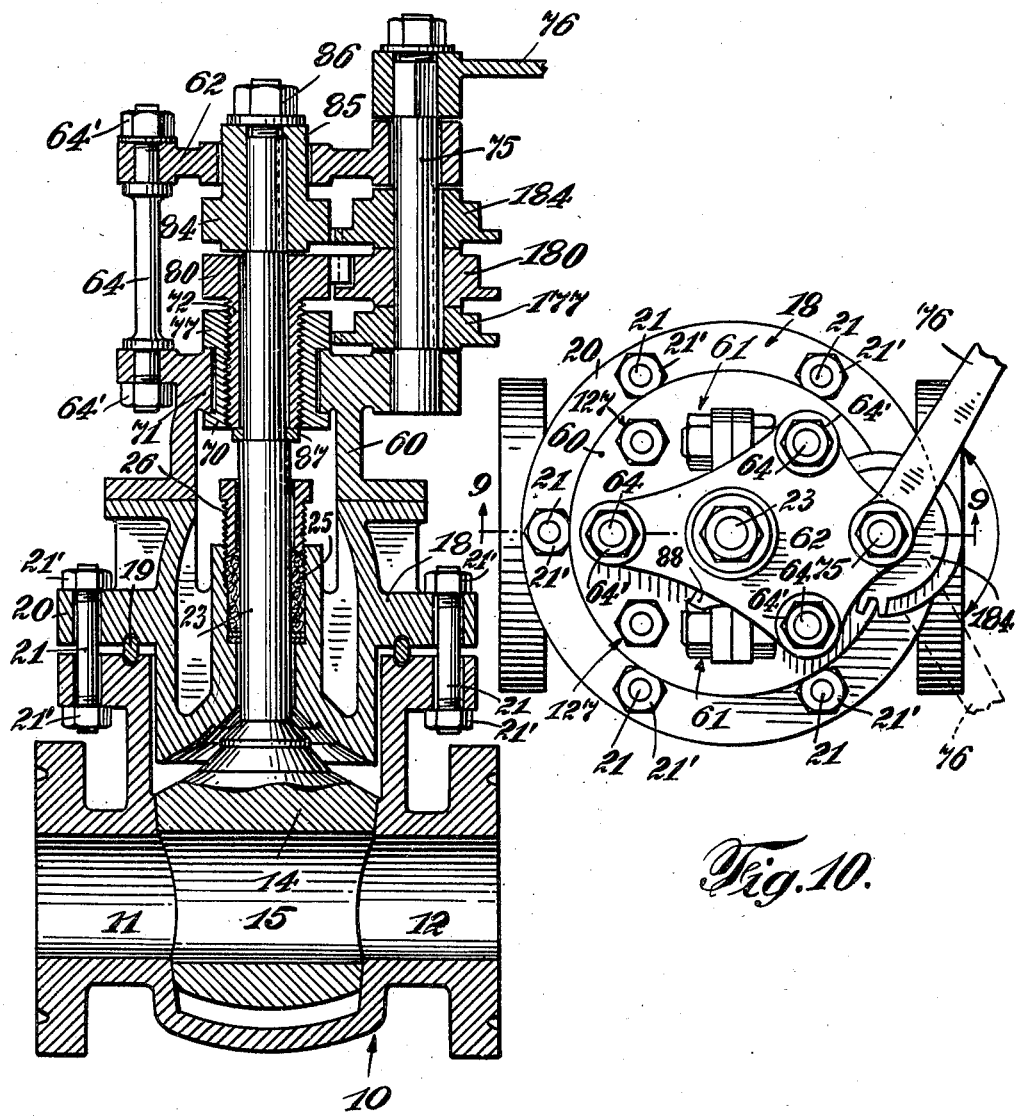

Figs. 5 to 8 inclusive are diagrammatic illustrations of the various positions assumed by the gears during operation of the operating mechanism;

Fig. 9 is a vertical section taken substantially on the line 9—9 of Fig. 10 and showing a modified form of operating mechanism;

Fig. 10 is a top or plan view of the valve of this modification, and

Figs. 11 to 14 inclusive are diagrammatic illustrations of the various positions assumed by the sets of gears during a cycle of operation of the valve.

Referring now to the drawings and more particularly to Figs. 1 to 3 inclusive, 10 indicates generally a valve casing having openings 11 and 12 therein for the passage of fluid. The valve casing is shaped to provide a seat for a tapered plug 14 which has an opening 15 extending diametrically therethrough in such manner that the opening 15 can be brought into register with the openings 11 and 12. The upper part of valve casing 10 has a flange 16 and is hollowed out at 17 to receive a bonnet 18 extending into the hollowed out part. Packing ring 19 is positioned between flange 16 and a flange 20 on the bonnet and bolts 21 passing through these two flanges are utilized in conjunction with nuts 21' to secure the bonnet to the casing. The bonnet 18 has a tubular part 22 attached to the main part thereof by webs 24. The tubular part 22 is bored for the passage of plug or valve stem 23 and part 22 is partially counterbored and internally threaded for the reception of packing material 25 compressed by a compression member 26 threaded into the counterbored part.

Secured to the top of the bonnet 18 is a supporting structure indicated generally at 27 which structure is secured to the bonnet by suitable bolts and nuts 127 not shown in Fig. 1. The structure 27 is provided with an opening threaded as at 28 in register with the tubular member 22. A sleeve 29 is externally threaded for engagement with the threads 28.

The valve stem 23 which passes through the tubular part 22 of the bonnet and through the stuffing box associated therewith also passes through sleeve 29. A ring or shoulder 30 at one end of sleeve 29 cooperates with another ring or shoulder 31 at the other end of this sleeve to prevent axial movement of the stem 23 relative to the sleeve. The upper end of stem 23 is journalled in a plate 32 secured in spaced relation to the structure 27 by spacer rods 34 passing through suitable openings in the plate and the structure and held by nuts 34'.

The structure 27 is provided with an enlarged and extended boss 35 having a through aperture for the passage of a drive shaft 36, the upper end of which extends through a boss 37 in plate 32. A handle 38 is fixedly secured to the upper end of drive shaft 36. Extending from a part of plate 32 is an elongated boss 39 apertured for the passage of a crank shaft 40, having a crank 41 on the lower end thereof. A nut 42 is threaded on to the upper end of the crank shaft 40.

The sleeve 29 is provided with two spaced ears 44 apertured for the passage of a pin 45 which holds one end of a connecting rod 46 to these ears. The other end of connecting rod 46 is secured to a pin 47 extending downwardly from the crank 41. Immediately above crank 41 is a gear 48.

A pinion 148 is keyed on the drive shaft 36 and this pinion 148 is of mutilated character in that it is provided with teeth only in a portion of the periphery thereof, which teeth can mesh with the teeth of gear 48.

A mutilated gear or gear sector 49 is keyed to the stem 23 while a companion mutilated pinion gear or gear sector 149 is keyed to the drive shaft 36. Gear 49 as shown in Fig. 5 has teeth only over a relatively short arc of its periphery and at the termination of these teeth the gear is provided with arcuate shaped stops 50. The extreme teeth of this gear are of reduced height so that a circular part 51 of the mutilated pinion 149 can pass thereunder and engage the stops 50. Pinion 149 as shown is provided also with teeth in an arc of relatively short length.

The use and operation of this mechanism is substantially as follows. Let it be assumed that the plug is in closed position, that is, in a position in which the opening 15 thereof is at right angles to the position shown in Fig. 1. In this position the companion gears and other apparatus bear substantially the relations shown in Fig. 5 wherein it will be seen that the teeth of pinion 148 are in mesh with the teeth of gear 48 while the circular part 51 of pinion 149 is in engagement with one of the stops 50 on gear 49. This engagement of these two parts of the gears 49 and 149 serves as a lock to prevent rotation of gear 49 until the teeth of these two gears are in mesh. The handle 38 under these conditions is substantially in the position shown in Fig. 3 in dotted lines.

When it is desired to open the valve, i. e., to rotate it through 90° to align opening 15 with passages 11 and 12, the handle 38 is rotated counterclockwise from the dotted line position of Fig. 3 to the full line position thereof. As a result of the initiation of such counterclockwise movement it will be seen that the drive shaft 36 is rotated also counterclockwise thereby rotating pinions 148 and 149 in the same direction. Rotation of pinion 148 causes a clockwise rotation of gear 48 and consequently of crank 41 moving the connecting rod 46 from the Fig. 5 position to a mid-point position resembling dead center as shown in Fig. 6. This rotation of the crank and movement of the connecting rod causes a rotation of sleeve 29, which being threaded into the structure 27 is caused to move upwardly carrying the stem 23 along with it and consequently lifting plug 14 and breaking the seal of this plug with its seat. During this initial movement or until the crank reaches its mid-position, the gear 49 remains locked due to the engagement between the parts 50 and 51, so that the stem is locked against rotation.

At the moment the connecting rod reaches its mid-point position (Fig. 6) the teeth of pinion 148 are in condition to move out of mesh with the teeth of gear 48. At the same time the teeth of pinion 149 are in position to move into mesh with the teeth of gear 49. As movement of the handle 38 is continued the next phase of operation of the mechanism is accomplished, that is, the gear 49 is rotated by pinion 149 until the part 51 engages the previously unengaged stop 50. This rotation of gear 49 causes a rotation of the stem 23 through an angle of approximately 90° thereby moving the plug from a closed to open position while the plug is elevated. During the movement of the stem 23 no axial movement thereof is accomplished since the connecting rod is at its mid-point position resembling dead center so that even though friction exists between the stem and sleeve 29 such friction cannot impart rotation to gear 48. When this rotary movement of the plug has been accomplished the operating parts are substantially in the position shown in Fig. 7 wherein it will be seen that gear 49 is again locked against movement while pinion 148 is about to come into mesh with the teeth of gear 48.

The final movement of the handle 38 in completing this unidirectional movement causes the teeth of pinion 148, now in mesh with the teeth of gear 48, to rotate this latter gear, still in clockwise manner, until the connecting rod assumes a Fig. 8 position. This movement of the connecting rod from the Fig. 7 to the Fig. 8 position amounts to a reversal in the rotation of sleeve 29 causing it to be moved downwardly and to carry the stem 23 along with it to again seat the plug in its seat. The parts as shown in Fig. 8 illustrate the position of these parts when the valve is in the Fig. 1 position.

When it is desired to reverse the valve, that is, move it from open to closed position, it is necessary merely to move the handle 38 clockwise from full line position of Fig. 1 to dotted line position thereof. Such movement accomplishes a reversal of that described previously so far as the operating parts are concerned but again the results are the same, namely, the plug is first moved axially upwardly without rotary movement, is then rotated without axial movement and is finally moved axially in reverse direction to reseat the plug.

In the embodiment of the invention shown in Figs. 9 and 10 the valve casing 10 and the bonnet 18 are constructed in the same manner as previously described so that the same reference characters have been applied to the corresponding parts. The supporting structure, however, of this modification is different from that of Fig. 1 and the operating parts likewise are different. To the top of the bonnet 18 is secured a supporting structure 60 made of two parts which can be fastened together by bolt and nut assemblies 61 (Fig. 10). Again use is made of a top plate 62 supported by the structure 60 and spaced therefrom by space bars 64 held in place by nuts 64'. The purpose of making the part 60 in two parts or of split formation is to permit the mounting of a sleeve 70 having upper and lower flanges fitting against the top and bottom surfaces of a ring like formation 71 in the supporting structure. Engagement between these upper and lower flanges and the ring 71 limits the sleeve 70 to rotary movement. The sleeve 70 is internally threaded to be engaged by the external threads of a second sleeve 72 through which the stem 23 passes. The part 60 and the plate 62 are provided with aligned openings in which is journalled a drive shaft 75 having a handle 76 keyed to the top thereof and fastened thereto.

The upper end of sleeve 70 is shaped in the form of a mutilated gear 77 of the shape shown in Fig. 11, in that it is provided with teeth extending through a relatively short arc on its periphery and is provided with an arcuate shaped stop 78 at one end of the row of teeth. Associated with the gear 77 is a companion pinion 177 also in the form of a mutilated gear having teeth extending through a short arc therearound and having a circular part 79. Pinion 177 is keyed to the drive shaft 75. Formed on, or otherwise secured to, the top of the second sleeve 72 is a second mutilated gear 80 shaped in the manner of the gear 77 but with a stop 81 positioned at the opposite end of the row of teeth. Associated with the gear 80 is a pinion 180 keyed to drive shaft 75 and shaped substantially in the same fashion as the pinion 177. Keyed to the stem 23 is a gear 84 also of mutilated fashion and having a journal part 85 extending through the plate 62. A nut 86 threaded on the end of the stem locks the stem to the gear against relative axial movement. The gear 84 and a ring or shoulder 87 act to limit the stem 23 to rotary movement relative to the inner sleeve 72. A pinion 184 cooperates with the gear 84 and this pinion is shaped substantially in the same fashion as pinions 177 and 180. The gear 84 differs from the gear 77 and 80 in that it is provided with two stops 88 instead of a single stop.

The operation and use of this mechanism is substantially as follows. Again let it be assumed that the plug is in the closed position or in a position at 90° to that shown in Fig. 1. The relation between various gears and their companion pinions under these conditions is shown in Fig. 11 wherein it will be seen that the gear 84, keyed to the valve stem, is locked against movement by contact between the circular part of pinion 184 and one of the stops 88. At the same time, the gear 80 is locked against movement by contact between the circular part of pinion 180 and the stop 81. The teeth of pinion 177 are in mesh with the teeth of gear 77. The operating handle under these conditions will be in the dotted line position of Fig. 10. When it is desired to open the valve the operating handle 76 is rotated counterclockwise from the dotted line position to the full line position of Fig. 10 causing a consequent counterclockwise rotation of the drive shaft 75 and pinions 177, 180 and 184.

During the first part of such movement of the handle 76 rotation of pinion 177 in the direction shown by arrows in Fig. 11 causes a rotation of gear 77 secured to the outer sleeve 70. Since this outer sleeve 70 is held against axial movement, it follows that its rotation causes an upward movement of the inner sleeve 72 in threaded engagement therewith. The upward movement of this inner sleeve is assured due to the fact that the gear 80 on the upper end thereof is locked against rotation. Upward movement of inner sleeve 72 causes an upward axial movement of the stem 23 lifting the plug 14 from its seat. The axial movement is of limited character determined by the number of teeth of the pinion 177 and gear 77 in engagement at the initiation of the handle movement. The relative positions of the operating parts at the completion of this axial movement are shown in Fig. 12 wherein it will be seen that the circular part 79 of pinion 177 is in engagement with the stop 78 of gear 77 thereby locking this gear against rotation. At the same time the teeth of pinion 184 are at a positon in which meshing of its teeth with those of gear 84 is about to be accomplished. The gear 80 is still locked against movement in the manner shown in Fig. 12.

Continued movement of the handle results in pinion 184 causing rotation of gear 84 while gears 80 and 77 are locked. Rotation of gear 84 causes rotation of stem 14 and this rotation is continued through an angle of 90° moving the plug, while elevated, to the open position thereof. The relation of the parts at the conclusion of this stem rotation phase of operation is shown in Fig. 13 wherein it will be seen that gear 77 is still locked by pinion 177 while gear 84 has been locked by the circular part of pinion 184. At this time the teeth of pinion 180 are in position to become enmeshed with the teeth of gear 80.

As the final degree of movement of the handle is accomplished, all three pinions are still rotated in the same direction but only one of the gears is moved by its pinion, namely gear 80 is moved by pinion 180 causing a rotation of the inner sleeve 72, which rotation, due to the locking of sleeve 70 by gear 77, moves the sleeve 72 in rotary fashion and downwardly. The downward movement is assured by the threaded engagement between the inner and outer sleeves. Since gear 84 is located against rotation, it follows that rotary and downward axial movement of sleeve 72 carries the stem 23 downwardly in an axial direction reseating the plug. The valve can be closed by moving the handle in reverse direction, causing a reversal in the steps of operation of the gears and pinions, but again with the same sequence of stem and plug movement.

The gears and pinions of both forms of the invention are so shaped that where necessary a gear can move longitudinally relative to its pinion, which is held against such movement. By reference to Fig. 4 it will be seen that the gear G (representing any of the proper gears before described) is capable of limited longitudinal movement relative to the companion pinion P without disturbing the operating relations therebetween.

From the foregoing it will be seen that the present invention in either form illustrated and described, provides new, simple and efficient mechanism for the operation of a plug valve. The mechanism makes use of a minimum of parts which are of such design as to possess the rugged characteristics desirable in a valve of this charactor. The operating mechanism is of the utmost simplicity and possesses extremely satisfactory operating efficiency. In either form of the invention the operation of the parts thereof either for opening or closing the plug valve assures first axial movement of the plug without rotary movement thereof, rotation of the plug without axial movement and then reverse axial movement without rotation so that it follows that turning of the plug is accomplished without endangering the normally contacting surfaces of the plug and of its seat. While the sealing element has been described and illustrated as comprising a tapered plug, it will be evident that the operating mechanism can be used equally well with other types of sealing elements.

It is to be understood that the invention is capable of modification beyond the illustrated embodiments, in view of which such limitations as are to be imposed thereon are only those set forth in the following claims.

What is claimed is:

1. A valve of the type described comprising a casing, a stem for said valve extending from said casing, an operating member above said casing, a sleeve surrounding said stem and mounted for rotation and axial movement, any movement of said sleeve causing axial movement of the stem, and connections between said operating member and said sleeve and said stem, whereby selected unidirectional movement of said operating member causes sequential axial movement of said stem without rotation thereof, rotation of said stem without axial movement thereof, and reverse axial movement of the stem without rotation thereof.

2. A valve of the type described comprising a casing, a stem for said valve extending from said casing, an operating member mounted above said casing, a sleeve mounted for rotation and axial movement, said sleeve being so related to said stem that any movement thereof causes axial movement of the stem, and connections between said operating member and said stem, whereby selected unidirectional movement of said operating member causes sequential axial movement of said stem, rotation of said stem, and reverse axial movement of the stem, said connections operating to lock said stem against movement of one type during movement of the other type.

3. A valve of the type described comprising a casing, a stem for said valve extending from said casing, an operating member, a sleeve member surrounding said stem and movable to impart axial movement to said stem, a crank operatively connected to said operating member for intermittent rotation thereby during continuous movement of said operating member in either of its directions of movement, a connecting rod between said crank and said sleeve whereby rotation of said crank causes axial movement of said sleeve, and a connection between said operating member and said stem for imparting rotation to said stem.

4. A valve of the type described comprising a casing, a stem for said valve extending from said casing, an operating member, a sleeve member surrounding said stem and movable to impart axial movement to said stem, a crank operatively connected to said operating member for rotation thereby at spaced intervals during continuous movement of said operating member in either of its directions of movement, a connecting rod between said crank and said sleeve whereby rotation of said crank causes axial movement of said sleeve, and a connection between said operating member and said stem for imparting rotation to said stem, said connection being operable during the interval between rotations of said crank.

5. A valve of the type described comprising a casing, a stem for said valve extending from said casing, an operating member, a sleeve member surrounding said stem and movable to impart axial movement to said stem, a crank, connections between said operating member and said crank for imparting rotation thereto at spaced intervals during continuous movement of said operating member in either of its directions of movement, a connecting rod between said crank and said sleeve whereby rotation of said crank causes axial movement of said sleeve, and a connection between said operating member and said stem for imparting rotation to said stem, said connections being operable during selected unidirectional movement of the operating member to cause axial movement of the stem, rotation thereof, and reverse axial movement thereof in sequence.

6. A valve of the type described comprising a casing, a stem for said valve extending from said casing, an operating member, a sleeve member surrounding said stem and movable to impart axial movement only to said stem, a crank connected to said sleeve whereby selected unidirectional rotation of said crank causes axial reciprocation of said stem, a connection between said operating member and said stem for imparting rotation to said stem, and a connection between said operating member and said crank for rotating said crank only before and after rotation of said stem.

7. A valve of the type described comprising a casing, a stem for said valve extending from said casing, an operating member, a sleeve member surrounding said stem and movable to impart axial movement to said stem, a crank operatively connected to said sleeve whereby rotation of said crank causes axial forward and reverse movement of said stem, a connection between said operating member and said stem for imparting rotation to said stem, and a connection between said operating member and said crank operable to rotate said crank at spaced intervals during continuous movement of said operating member in either of its directions of movement, whereby selected unidirectional movement of the operating member causes axial movement of the stem, rotation thereof, and reverse axial movement thereof in sequence.

8. A valve of the type described comprising a casing, a stem for said valve extending from said casing, inner and outer sleeves in threaded relation, the outer sleeve being confined to rotary movement, said stem passing through the inner sleeve and being confined to rotary movement relative thereto, an operating member, connections between said operating member and said inner and outer sleeves and said stem whereby selected unidirectional rotation of said operating member causes sequential axial movement of said stem, rotation thereof and reverse axial movement thereof.

9. A valve of the type described comprising a casing, a stem for said valve extending from said casing, inner and outer sleeves in threaded relation, the outer sleeve being confined to rotary movement, said stem passing through the inner sleeve and being confined to rotary movement relative thereto, an operating member, connections between said operating member and said inner and outer sleeves and said stem whereby selected unidirectional rotation of said operating member causes sequential rotation of the outer sleeve to move said stem axially, rotation of said stem, and rotation of said inner sleeve to move said stem axially in reverse direction.

10. A valve of the type described comprising a casing, a stem for said valve extending from said casing, inner and outer sleeves in threaded relation, the outer sleeve being confined to rotary movement, said stem passing through the inner sleeve and being confined to rotary movement relative thereto, an operating member, pinions on said operating member, and companion gears on said inner and outer sleeves and said stem whereby selected unidirectional rotation of said operating member causes sequential axial movement of said stem, rotation thereof and reverse axial movement thereof, said companion pinions and gears locking the stem against movement of one type during movement of the other type.

11. A valve of the type described comprising a casing, a stem for said valve extending from said casing, inner and outer sleeves in threaded relation, the outer sleeve being confined to rotary movement, said stem passing through the inner sleeve and being confined to rotary movement relative thereto, an operating member, companion sets of pinion and gear connections between said operating member and said inner and outer sleeves and said stem whereby selected unidirectional rotation of said operating member causes sequential rotation of the outer sleeve with attendant axial movement of the inner sleeve and stem, then rotation alone of the stem, and finally rotation of the inner sleeve with attendant axial movement of said inner sleeve and stem in reverse direction.

WYLIE G. WILSON.